United States Patent [19]

Sugalski

[11] 4,322,484
[45] Mar. 30, 1982

[54] SPIRAL WOUND ELECTROCHEMICAL CELL HAVING HIGH CAPACITY

[75] Inventor: Raymond K. Sugalski, Gainesville, Fla.

[73] Assignee: General Electric Company, Gainesville, Fla.

[21] Appl. No.: 187,743

[22] Filed: Sep. 16, 1980

Related U.S. Application Data

[63] Continuation of Ser. No. 939,355, Sep. 5, 1978, abandoned.

[51] Int. Cl.³ .............................................. H01M 6/10
[52] U.S. Cl. .................................... 429/94; 429/120; 429/178
[58] Field of Search ................... 429/94, 175, 185, 120

[56] References Cited

U.S. PATENT DOCUMENTS

| | | | |
|---|---|---|---|
| 3,503,806 | 3/1970 | Sugalski | 429/55 |
| 3,650,842 | 3/1972 | Bougaran | 429/94 |
| 3,732,124 | 5/1973 | Cailey | 429/94 |
| 3,761,314 | 9/1973 | Cailey | 429/94 |
| 3,839,093 | 1/1974 | Twogood et al. | 429/185 |
| 3,862,861 | 1/1975 | McClelland et al. | 429/57 |
| 4,009,053 | 2/1977 | Schenk et al. | 429/94 |
| 4,029,856 | 6/1977 | Phillip et al. | 429/94 |
| 4,049,883 | 9/1977 | Schenk et al. | 429/94 |
| 4,053,687 | 10/1977 | Coibion et al. | 429/94 |

Primary Examiner—Anthony Skapars
Attorney, Agent, or Firm—Morgan, Finnegan, Pine, Foley & Lee

[57] ABSTRACT

A high current capacity electrochemical cell of the spiral wound type is provided. The cell includes an hermetically sealed casing and a terminal connection which engages exposed edges of an internally positioned spirally wound electrode plate for the transfer of current from the plate to a plurality of regions on the terminal. A thermally conductive ring is provided at the terminal connection to dissipate heat generated at the regions of current transfer.

17 Claims, 6 Drawing Figures

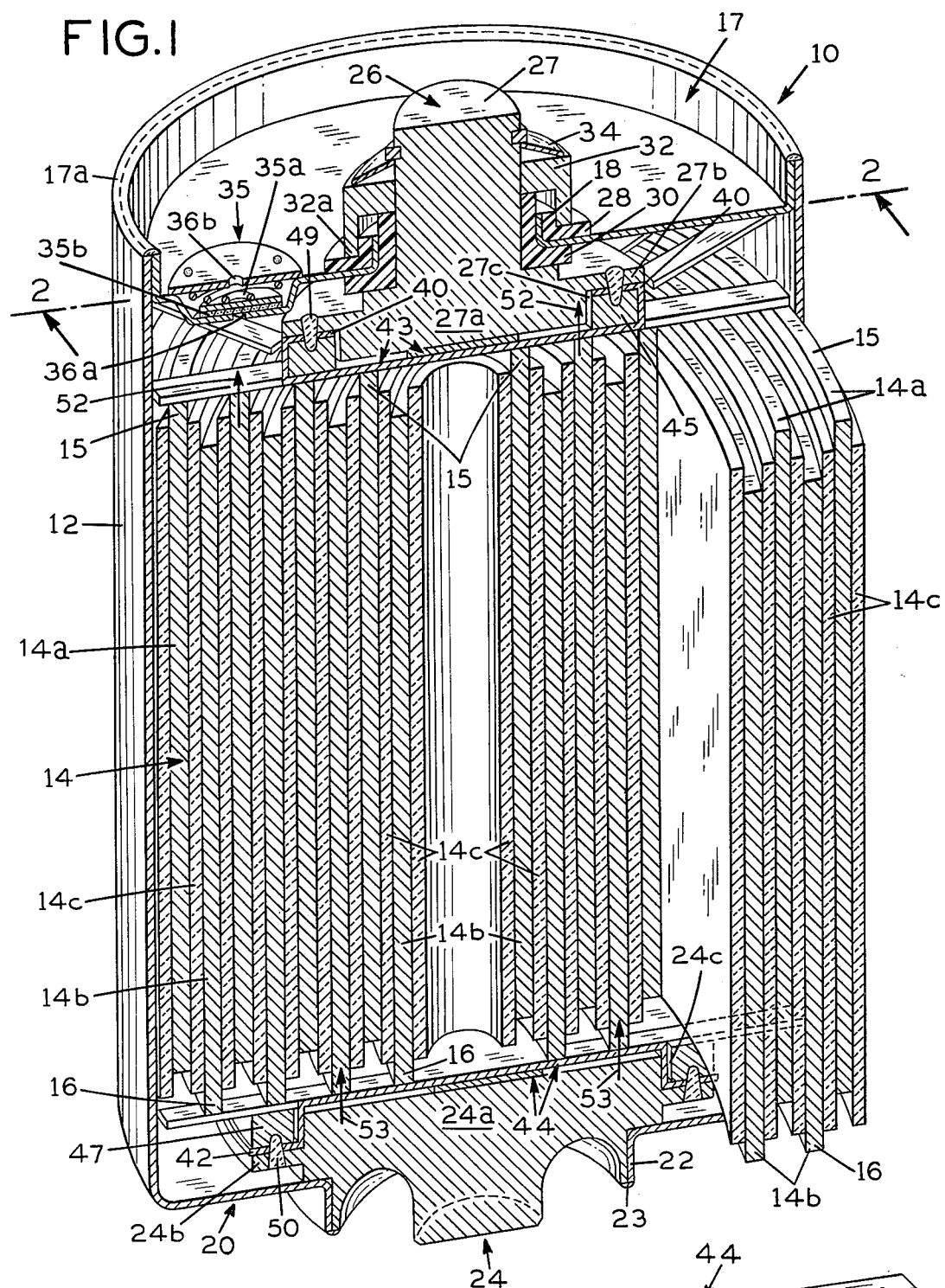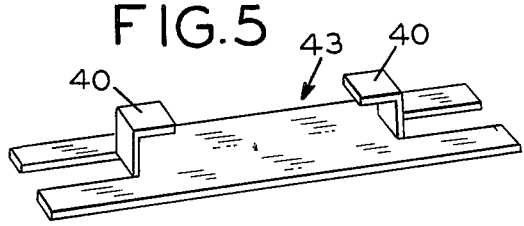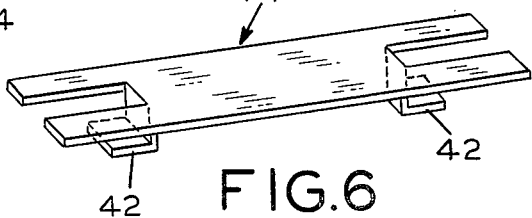

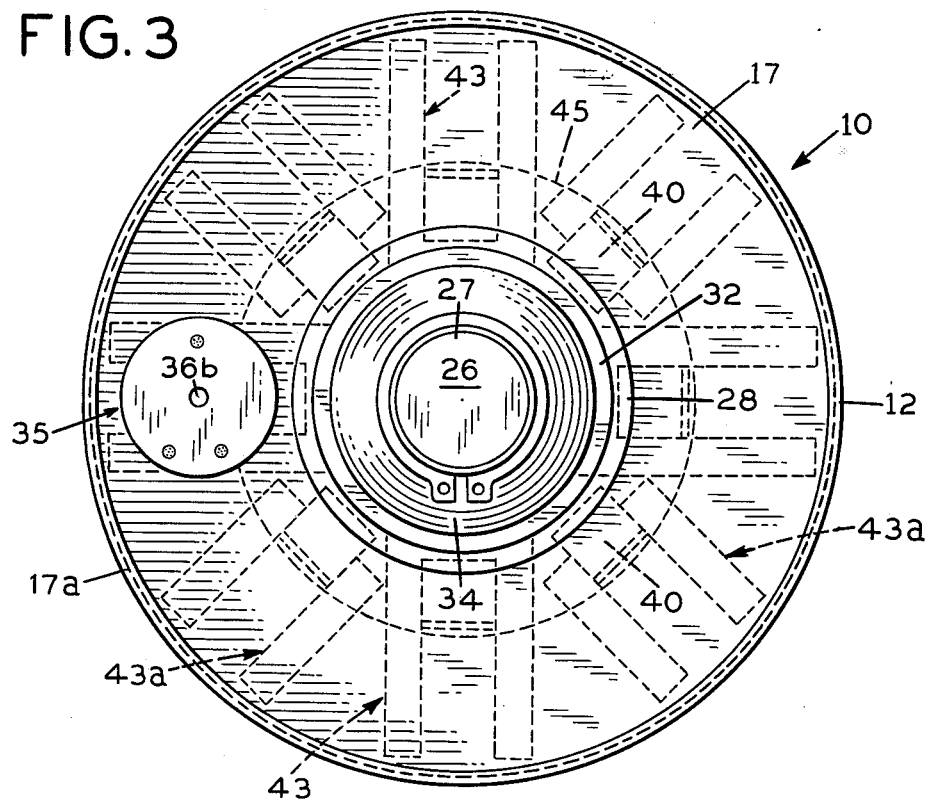
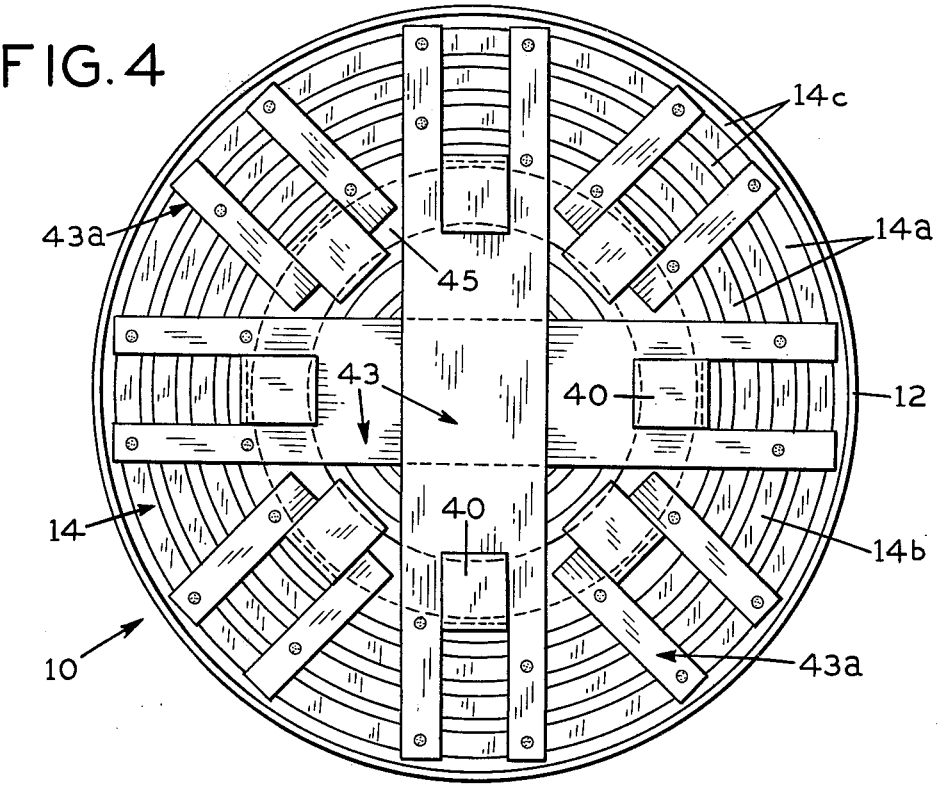

SPIRAL WOUND ELECTROCHEMICAL CELL HAVING HIGH CAPACITY

This is a continuation of application Ser. No. 939,355 filed Sept. 5, 1978, now abandoned.

FIELD OF THE INVENTION

The present invention relates to electrochemical cells and more particularly, it relates to electrochemical cells of the spiral wound type having terminal connections which offer low internal electrical impedance and very high current rating.

BACKGROUND OF THE INVENTION

In recent years, the small hermetically sealed rechargeable electrochemical cell has seen a number of advances in, e.g., its structure, its assembly and in the materials used in its manufacture. The basic construction of such a cell is shown in my prior patent, U.S. Pat. No. 3,503,806, assigned to the assignee of the present invention. That cell includes the familiar cylindrical casing and a spirally wound electrode assembly in which the positive and negative plates are longitudinally offset from one another, as well as from a separator, to provide an extended plate edge at one end of the electrode coil and another extended plate edge at the opposite end of the coil. The structure is provided with a conductive interconnecting strap which electrically connects the edges of the respective electrode coils to the cell terminals. This strap is attached at a number of contact points by percussion welding techniques. Some recent improvements to this cell structure have been suggested. In U.S. Pat. No. 4,029,856, it is disclosed to form the terminal strap in a rectangular shape having leg portions welded to the edges of the spirally wound electrode plate and having a central raised portion which is attached to the underside of the cell closure cap.

While the electrochemical cells of the foregoing type have proven to be very effective for low capacity service, i.e., up to about 10 ampere-hours, they are unfortunately not conductive to high capacity operations, due primarily to the structure and design of the terminal connections. These connections somewhat impede current flow and may generate undue amounts of heat at high current levels which can result in cell degradation or, in the case of malfunction of an emergency vent, dangerous pressure build-up. As is known in the art, generation of excessive heat and pressure in an electrochemical cell can present serious dangers to users and can cause damage to the cell due to cell degradation and hastened decomposition. This limitation of the aforementioned cells to carry high currents has discouraged their use in high current applications.

The solution of this problem has been to use an entirely different cell construction for high currents. Such high current cells are usually of the vented type wherein the cell is vented to the atmosphere in order to release gases generated internally and wherein liquid electrolyte floods the cell casing. Rather than using a spirally wound electrode assembly, the vented cells usually employ flat electrode plates having large plate-like terminal straps which are welded to the electrodes and are brought upwardly toward the top of the cell where they are affixed to a large terminal lug.

The flat plate vented cell succeeds for high current applications where the coiled electrode cell has not because, in part, the flat plates are well adapted to affixing heavy interconnecting conductive terminal straps between the electrodes and the terminal lug. Known sealed cell constructions are not adapted to low impedance connections between electrodes and terminals.

Although the flat plate vented cells provide high current delivery, the plate-to-terminal connections are costly to manufacture and their assembly is difficult since much of the fabrication must be done by hand. Moreover, vented cells ordinarily must be used in the upright position to ensure that the liquid electrolyte does not block the vent. Another restriction resides in the fact that flat plate cells are housed in rectangular impact-resistant containers and when several such cells are interconnected in a common case to form a battery, air cooling of the cells is inhibited unless the cells are spaced apart. Increasing cell spacing necessitates increasing the overall dimensions of the battery case which, under certain circumstances such as for uses in aircraft, can be quite unacceptable.

Accordingly, it is an object of the present invention to provide a sealed electrochemical cell of the spiral wound type having high current capacity.

Other objects of the invention are to provide high capacity sealed electrochemical cells of the spiral wound electrode type which have reduced internal impedance, improved means for dissipating internally generated heat during high current discharge, and improved means of assembly.

These and other objects will become apparent from the following summary and description of the invention taken in conjunction with the accompanying drawings.

SUMMARY OF THE INVENTION

Broadly contemplated, the present invention provides a high capacity electrochemical cell of the spiral wound type. The cell is comprised of a sealed casing, at least one external electrical terminal at an end of the casing, and at least one spirally wound electrode plate in the casing electrically connected to the terminal and having a plurality of exposed plate edge portions. The electrically conductive terminal has an inner surface engaging the exposed edge portions of the electrode plate so as to be in electrical contact therewith, thereby to provide a plurality of electrode edge contact areas on the terminal inner surface for the transfer of current from the electrode plate to the terminal. The terminal also has a projecting portion which comprises the exterior electrical terminal of the cell.

In one preferred embodiment, electrical contact between the terminals and the exposed edge portions of the electrode plate is made by a plurality of current transfer conductive tabs. The conductive tabs have body portions which are positioned on the exposed edge portions of the electrode plates and have raised portions which contact a plurality of regions on the inner surface of the terminals. A thermally conductive member is also provided at the terminal connections to provide a heat sink for dissipating heat generated at the connections.

DESCRIPTION OF THE DRAWINGS

FIG. 1 is a cross-sectional perspective view of the preferred electrochemical cell of the invention.

FIG. 3 is a plan view, taken along line 3—3 of FIG. 2, of the upper portion of the electrode assembly for the cell of FIGS. 1 and 2, illustrating the conductive tabs.

FIG. 4 is a view taken similar to FIG. 3 taken along line 4—4 of FIG. 2, showing the thermally conductive heat sinking ring in position relative to the electrode coil and the conductive tabs affixed to the edges of one of the cell electrodes.

FIG. 5 is a perspective view of one of the upper current transfer conductive tabs of the invention.

FIG. 6 is a view similar to FIG. 5 showing a lower current transfer conductive tab.

DETAILED DESCRIPTION OF THE INVENTION

Figure 2:
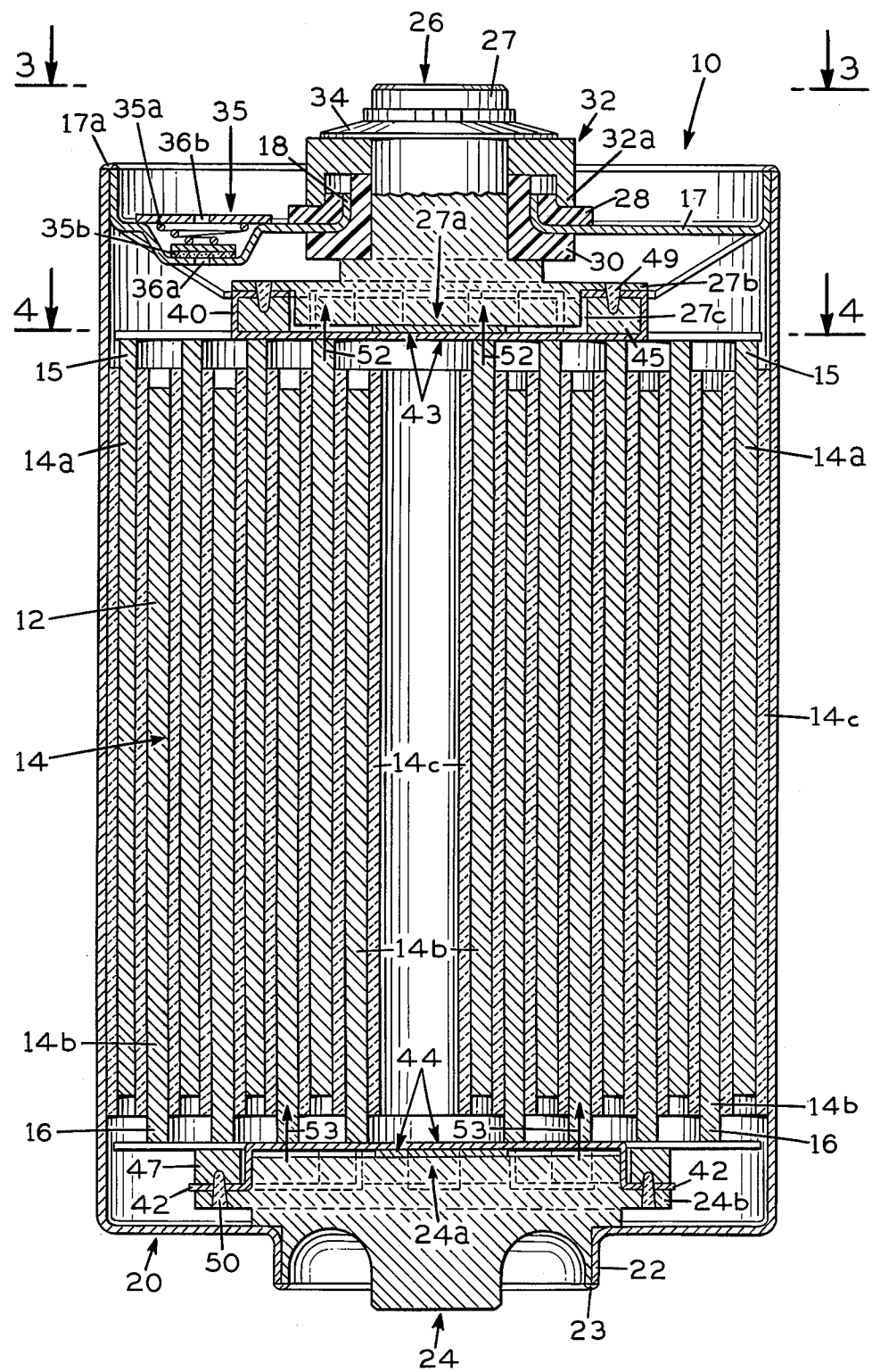
FIG. 2 is a vertical cross-sectional view of the cell of FIG. 1 taken along line 2—2 of FIG. 1.

Referring to the drawings and particularly to FIGS. 1 and 2, the electrochemical cell of the invention, generally indicated by reference numeral 10, includes a casing 12, in which is contained an electrode coil 14. The electrode coil 14 consists of a positive plate 14a and a negative plate 14b interleaved with a separator 14c all spirally wound to form a plurality of alternating anode and cathode convolutions, each spaced apart by and in contact with a layer of the separator.

It will be understood that the electrode assembly 14 is shown more or less schematically, no effort being made to reproduce details of this known construction. The electrode may be of any suitable type, such as a sintered porous nickel plaque adhered to a metal substrate impregnated with active material, e.g., nickel hydroxide and cadmium hydroxide. The electrodes can also be of the "pasted" type wherein the active material is contained in a paste which is applied to the substrate. The cell of the invention is not restricted to any particular electro-chemical reaction or electrode type; thus, the cell can also be of the lead-acid type, and the electrode substrates can be perforated, corrugated, etc.

As will appear more fully in the description which follows, it is preferred that the axial positions of the anode and cathode electrodes 14a, 14b be offset axially so that the upper edges 15 of the anode project from the top of the coil 14 and the lower edge 16 of the cathode 14b project from the bottom of the coil. A fuller description of this arrangement and the method of assembling and making the electrodes will be found in my U.S. Pat. No. 3,503,806 and in commonly assigned U.S. Pat. No. 4,029,856.

Returning to FIGS. 1 and 2, the casing 12 is provided at its upper end with a cover member 17 affixed to the casing and having an upturned rim 18 defining a central opening. The lower end of the casing is integrally formed with a bottom cover 20 also having a rim 22 defining a central opening. A bottom terminal post 24 serving as the negative cell terminal is received within the central opening and secured to the lower rim 22 by a weld 23 which seals the bottom of casing 12. As will be apparent hereinafter, the conductive post is affixed to the negative electrode coil 14b in a manner which presents only a low internal impedance to current transfer between the electrode and terminal.

An upper terminal post 26 is similarly positioned at the upper end of the casing 12 so as to extend from the interior to the exterior of the casing where it terminates to form the positive terminal 27.

In addition to the terminal 27, the post has an enlarged lower portion 27a formed with a peripheral flange 27b and a recess 27c for the reception of a thermally conductive member sometimes referred to as a heat sinking ring, as will be described hereinafter.

Insulator 28 and sealing ring 30, each of electrical insulating material, are disposed on the outer and inner sides of the upstanding rim 18, respectively, so as to isolate the positive terminal post electrically from the casing. Sealing ring 30 is also used to hermetically seal the casing at the top. Thus, as best seen in FIG. 2, annular clamp 32 having a downwardly extending rim portion 32a fits over the insulator 28 and effects an interference fit between sealing ring 30, upstanding rim 18 of cover 17 and the upper terminal post 26. Preferably, the sealing ring 30 is constructed of nylon capable of up to about 25% compression in the lateral direction. Other materials might be used, however, such as polysulfone which has a lower compression range and a higher temperature rating.

The top closure member 17 also carries a pressure release vent mechanism 35 designed to release to the atmosphere gases which are internally generated during use of the cell, venting occurring when gas generation causes an excessive pressure buildup inside the cell. Vented gases escape through orifices 36a, 36b when the internal gas pressure exceeds the opening force exerted by spring 35a on the movable sealing gasket 35b.

Although in the embodiment disclosed herein the casing is constructed of metal and the upper closure member 17 and lower post 22 are secured to the casing by welds, it should be remarked that other methods of assembly are available. For example, the casing may be constructed of injection-molded plastics having whatever structural integrity is required for the particular use to which the cell is designed. In such case, the top closure member 17 may be constructed of a similar plastic, reinforced if necessary, and fused to the casing at its periphery. In this event, the lower terminal post 24 ordinarily will be provided with an insulating and sealing arrangement such as that used with upper terminal post 26. As can be seen in FIGS. 1 and 2, the lower post 24 also has an interior portion 24a of larger cross-section than its terminal portion and is provided with a laterally extending flange 24b that defines the interior recess 24c.

In accordance with the invention, the terminal posts 24, 26 are so affixed and disposed relative to the electrode assembly 14 that current is transferred from the positive and negative electrodes to the positive and negative terminals over a plurality of regions on the terminals so as to limit the energy loss and internal heating incurred.

To provide current transfer between the electrode assembly and the terminal posts, a plurality of current transfer conductive tabs 40 (one of which is shown in FIG. 5) are affixed electrically and physically to the top edges 15 of the anode. Similarly, a plurality of current transfer conductive tabs 42 (one of which is shown in FIG. 6) are electrically and physically connected to the lower extending edges 16 of the cathode electrodes. These tabs, sometimes referred to as current collectors, can be integrally formed with conductive straps 43, 44 or they can be affixed and extend directly from the edges of the electrode plate. It is preferred, however, where the current transfer conductive tabs are used, to affix them by percussion welding or other suitable electrical connecting techniques to the edges of the electrode assembly in order to avoid the necessity of forming and/or affixing tabs to the individual electrode prior to winding of the electrode assembly.

The tabs 40, 42 are constructed of a malleable metal and are formed with raised portions so as to extend into and partially occupy the recesses 27c, 24c in the terminal posts while being in intimate physical and electrical contact with the terminal post and with one of the thermally conductive members, heat-sinking annular rings 45, 47, which occupy the remainder of the recesses. The rings 45, 47, the tabs 40, 42, and the flange portions 27b, 24b of the terminal posts are maintained in intimate physical and electrical contact by welds 49, 50. These welds may be formed by laser or other welding techniques.

The configuration and association of the current transfer tabs 40, 42 and their method of affixation to the electrode assembly is perhaps best apparent in FIG. 3. This figure shows the top of the electrode assembly 14, wherein the upper edges 15 of the anode are seen to be exposed. The upstanding current transfer conductive tabs 40 or current collectors, are arranged about an imaginary circle corresponding to the outer diameter of the heat-conductive ring 45 (not shown in FIG. 3). Two pairs of tabs are formed integrally with the crossing conductive straps 43 which extend generally from one edge of the spirally wound electrode assembly to the other. Four additional tabs 40 extend upwardly from shorter straps 43a so as to be spaced equidistantly from adjacent tabs. Each of the straps 43, 43a is welded directly to the top edges 15 of the anode coil. Since each of the straps intersects several convolutions of the anode edges, electrical contact between each of the conductive straps 43, 43a is established at a plurality of points where current transfer can readily take place.

FIG. 4 illustrates the top portion of the electrode assembly with the heat conductive ring 45 in place and the current transfer conductive tabs 40 welded to the ring 45. The straps 43, 43a are made as wide as possible in order to provide the maximum area of contact between the exposed edges of the electrode and the conductive straps 43, 43a. It will be understood that the connections between the negative electrode, the current transfer conductive tabs 42 (and their associate straps 44) and the lower heat sinking ring 47 are made in a similar fashion.

Following application of the heat conductive rings, the terminal post 26 is fitted onto the top of the assembly. The appearance of the assembled structure is shown in FIGS. 1 and 2, the flange portion 27b of the terminal post 26 extending over the bent-over portions of the tabs 40 and affixed to the conductive ring 45 by welds 49.

Once the thermally conductive heat sinking rings 45, have been affixed to the current transfer conductive tabs 40, 42 and the terminal posts 24, 26 affixed, the cell may be closed and sealed.

With the above-mentioned construction and method of assembly, the current carrying capacity of the cell is greatly increased, first by reason of the fact that several intimate points of physical and electrical contact are provided to transfer current from the electrode to the terminals; second, by providing a path of high thermal conductivity to the tabs 40 for substantially their entire length while at the same time providing a path of low electrical resistance to the flow of current. Thus, with respect to this second feature, current transferred by the tabs 40 and associated conductive straps finds an immediate path of conduction from the tabs 40 to the heat sinking ring and the terminal posts 24, 26 immediately upon leaving the electrodes. In other words, there is virtually no volume of these current collecting tabs 40 which is not in heat-sinking relationship to the heat sink ring 45 and the terminal post 26. Furthermore, while the tabs 40 are capable of providing the sole or primary path for the transfer of current between the electrodes and the terminal, current paths also exist from the exposed edges 15, 16 of the electrode coils to the conductive straps and, thence, directly to the terminal post. Such paths are shown schematically by the arrows 52, 53 in FIG. 2.

Another feature of the invention is that the terminal posts may be brought into direct physical and electrical contact with the top exposed edges of the electrode plates or with the current transfer straps or tabs affixed to the plates, thereby providing a large number of current transfer points and reduced impedance between the electrodes and cell terminal. Any sections of the current collectors which are not heat sunk are virtually eliminated with this construction.

The invention provides an improved, maintenance free sealed galvanic cell and method of manufacture of large capacity for use in, e.g., aircraft type batteries, or other heavy duty batteries. Since the cells require little or no maintenance, they may be used in any of various arrangements, such as a cluster, in-line, etc., permitting their installation in many areas of an aircraft or other confined environments heretofore not feasible with flooded type cells. Furthermore, since the cells are sealed, they are not limited to the usual upright position in order to avoid blockage of the gas vents. They do not require the high cost coated stainless steel battery case often found in present use. In fact, these cells can be assembled in plastic tubes, vacuum formed or injection molded cases. As a result, the total volume of a resulting battery comprising several such cells can be made less than with the present rectangular cubical form of flooded type cells.

The cells lend themselves readily to mechanized manufacture. When a metallic casing 12 is used, improved heat dissipation can be obtained. Moreover, the employment of high temperature separator materials, such as non-woven polypropylene may be incorporated into the electrode assembly at much lower cost than the present multi-layer separators presently used with flooded type cells, wherein the separator includes a vapor barrier to preclude the migration of oxygen gases between the positive and negative electrodes. Moreover, with the construction disclosed herein, the elements can be assembled with the use of a single nonmetallic seal.

A plurality of high capacity cells of the type disclosed herein may be interconnected to form a battery and thereafter cased in a vacuum formed plastic casing, with the cells being spaced in such manner that cooling air may be passed through the interstices between cells.

While I have shown in the drawings and have described in detail one preferred embodiment of the invention, it is to be understood that this description is an exemplification. Certain variations and adaptions can be made to the electrochemical cell described above without departing from the spirit of the invention which is to be limited only by scope of the appended claims.

What is claimed is:

1. In an improved electrochemical cell having a sealed casing, at least one external electrical terminal at an end of the casing, at least one spirally wound electrode plate in said casing electrically connected to said terminal and having a plurality of exposed plate edge portions, the improvement comprising:

said electrically conductive terminal having an inner surface engaging said exposed edge portions of the electrode plate so as to be in electrical contact therewith, thereby to provide a plurality of electrode edge contact areas on said terminal inner surface for the transfer of current from the electrode plate to the terminal, said terminal further having a projecting portion at the exterior of said casing, and wherein said cell includes a heat sink encircling said terminal thermally coupled between said terminal and said electrode plate.

2. The electrochemical cell of claim 1 further comprising a plurality of current transfer conductive tabs which electrically connect said exposed edge portions of said electrode plate with said terminal, said current transfer conductive tabs being in contact with said heat sink and engaging a plurality of regions on said inner surface of said terminal.

3. The electrochemical cell of claim 2 wherein said current transfer conductive tabs have raised portions and body portions, said body portions engaging said exposed edge portions of said electrode plate.

4. In an improved electrochemical cell having a sealed casing, at least one external electrical terminal at an end of the casing, at least one spirally wound electrode plate in said casing electrically connected to said terminal and having a plurality of exposed plate edge portions, the improvement comprising:

said electrically conductive terminal having an inner surface engaging said exposed edge portions of the electrode plate so as to be in electrical contact therewith, thereby to provide a plurality of electrode edge contact areas on said terminal inner surface for the transfer of current from the electrode plate to the terminal, said terminal further having a projecting portion forming electrical terminal at the exterior of said casing, said cell further comprising a plurality of current transfer conductive tabs which electrically connect said exposed edge portions of said electrode plate with said terminal, said current transfer conductive tabs engaging a plurality of regions on said inner surface of said terminal; and wherein said current transfer conductive tabs have raised portions and body portions, said body portions engaging said exposed edge portions of said electrode plate, and wherein said inner surface of said terminal is provided with peripheral recess and said raised portions of said current transfer conductive tabs contact said terminal along said peripheral recess.

5. In an improved electrochemical cell having a sealed casing, at least one external electrical terminal at an end of the casing, at least one spirally wound electrode plate in said casing electrically connected to said terminal and having a plurality of exposed plate edge portions, the improvement comprising:

said electrically conductive terminal having an inner surface engaging said exposed edge portions of the electrode plate so as to be in electrical contact therewith, thereby to provide a plurality of electrode edge contact areas on said terminal inner surface for the transfer of current from the electrode plate to the terminal, said terminal further having a projecting portion forming electrical terminal at the exterior of said casing, said cell further comprising a plurality of current transfer conductive tabs which electrically connect said exposed edge portions of said electrode plate with said terminal, said current transfer conductive tabs engaging a plurality of regions on said inner surface of said terminal; and wherein said current transfer conductive tabs have raised portions and body portions, said body portions engaging said exposed edge portions of said electrode plate, and wherein a thermally conductive member is positioned in heat sinking relation to said current transfer conductive tabs.

6. The electrochemical cell of claim 4 wherein a thermally conductive member is positioned in said peripheral recess of said terminal so as to be in heat sinking relation to said current transfer conductive tabs.

7. The electrochemical cell of claim 3 wherein said current transfer conductive tabs are affixed to said exposed edge portions of said electrode plate over substantially the entire length of said tabs.

8. In an improved electrochemical cell having a sealed casing, at least one external electrical terminal at an end of the casing, at least one spirally wound electrode plate in said casing electrically connected to said terminal and having a plurality of exposed plate edge portions, the improvement comprising:

said electrically conductive terminal having an inner surface engaging said exposed edge portions of the electrode plate so as to be in electrical contact therewith, thereby to provide a plurality of electrode edge contact areas on said terminal inner surface for the transfer of current from the electrode plate to the terminal, said terminal further having a projecting portion forming said electrical terminal at the exterior of said casing; and wherein said terminal is hermetically sealed to said casing by means of an interference fit, said interference fit employing a sealing ring being constructed of a material capable of up to about 25% compression in the lateral direction.

9. The electrochemical cell of claim 1 wherein said terminal has an inner portion positioned in said casing which inner portion comprises the bulk of the material of said terminal.

10. The electrochemical cell of claim 6 wherein said thermally conductive member is a circular ring which is positioned in said recess of said terminal so that said raised portions of said current transfer conductive tabs and said circular ring occupy substantially all of said recess in said terminal.

11. The electrochemical cell of claim 1 wherein said electrode plate is spirally wound with a second electrode plate having a plurality of exposed second plate edge portions.

12. The electrochemical cell of claim 11 further comprising:

a second conductive terminal at another end of said casing, said second conductive terminal having an inner surface engaging said exposed second plate edge portions so as to be in electrical contact therewith, thereby to provide a plurality of electrode edge contact areas on said second terminal inner surface for the transfer of current from said second electrode plate to said second terminal.

13. The electrochemical cell of claim 12 further comprising:

a second plurality of current transfer conductive tabs which electrically connect said exposed second plate edge portions with said second conductive terminal, said second plurality of current transfer conductive tabs engaging a plurality of regions on said second terminal inner surface.

14. The electrochemical cell of claim 13 wherein said second plurality of current transfer conductive tabs have raised portions and body portions, said body portions engaging said exposed edge portions of said second electrode plate.

15. The electrochemical cell of claim 14 wherein a second thermally conductive member is positioned in heat sinking relation to said second plurality of current transfer conductive tabs.

16. An electrochemical cell comprising:
a sealed casing having an electrical terminal projecting through an end thereof;
a spirally wound electrode plate enclosed within said casing;
an electrically conducting strap engaging edge portions of said electrode plate and having tabs for connection with said terminal; and
said terminal being provided with a peripheral recess along an inner surface thereof for mating with tabs of said strap.

17. An electrochemical cell comprising:
a sealed casing having an electrical terminal projecting through an end thereof;
a spirally wound electrode plate enclosed within said casing;
a strap connecting edge portions of said electrode plate with said terminal;
a heat sink encircling said terminal and in thermal contact therewith; and wherein
said strap includes tab means for engaging in thermal contact with said heat sink.

* * * * *